US008572585B2

(12) United States Patent
Toub et al.

(10) Patent No.: US 8,572,585 B2
(45) Date of Patent: Oct. 29, 2013

(54) USING COMPILER-GENERATED TASKS TO REPRESENT PROGRAMMING ELEMENTS

(75) Inventors: Stephen Harris Toub, Seattle, WA (US); Mads Torgersen, Issaquah, WA (US); Lucian Jules Wishchik, Seattle, WA (US); Anders Hejlsberg, Seattle, WA (US); Dmitry Lomov, Redmond, WA (US); Matthew J. Warren, Redmond, WA (US); Robert Eric Lippert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 13/162,328

(22) Filed: Jun. 16, 2011

(65) Prior Publication Data

US 2012/0324457 A1    Dec. 20, 2012

(51) Int. Cl.
*G06F 9/45*    (2006.01)
(52) U.S. Cl.
USPC ........... 717/136; 370/466; 717/116; 717/140; 719/320; 719/328
(58) Field of Classification Search
None
See application file for complete search history.

(56) References Cited

U.S. PATENT DOCUMENTS

| | | | |
|---|---|---|---|
| 5,999,987 A | 12/1999 | O'Farrell | |
| 7,248,603 B1 * | 7/2007 | Grunkemeyer et al. | 370/466 |
| 7,836,436 B2 * | 11/2010 | Ringseth et al. | 717/136 |
| 2004/0172638 A1 * | 9/2004 | Larus et al. | 719/328 |
| 2005/0246692 A1 * | 11/2005 | Poteryakhin et al. | 717/140 |
| 2007/0169012 A1 * | 7/2007 | Tan | 717/136 |
| 2008/0184210 A1 * | 7/2008 | Lee et al. | 717/136 |
| 2009/0228904 A1 * | 9/2009 | Meijer et al. | 719/320 |
| 2010/0185840 A1 | 7/2010 | Duffy | |
| 2010/0313184 A1 * | 12/2010 | Gustafsson et al. | 717/116 |

OTHER PUBLICATIONS

Anders Iogg, "DOLFIN: Automated Finite Element Computing", 2010, Simula Research Laboratory and University of Oslo, pp. 1-28, <http://delivery.acm.org/10.1145/1740000/1731030/a20-logg.pdf>.*

Hironori Kasahara, "Automatic Coarse Grain Task Parallel Processing on SMP Using OpenMP", 2001, Waseda University, pp. 1-19, <http://link.springer.com/content/pdf/10.1007%2F3-540-45574-4_13.pdf>.*

Pieter Bellens, "CellSs: a Programming Model for the Cell BE Architecture", 2006, Barcelona Supercomputing Center and UPC, pp. 1-11, <http://ieeexplore.ieee.org/stamp/stamp.jsp?tp=&arnumber=4090179>.*

Tsuyoshi Isshiki, "Multiprocessor SoC Design Framework on Tightly-Coupled Thread Model", 2008, Tokyo Institute of Technology, pp. 1-6, <http://ieeexplore.ieee.org/stamp/stamp.jsp?tp=&arnumber=4815572>.*

(Continued)

*Primary Examiner* — Thuy Dao
*Assistant Examiner* — Khanh Dang
(74) *Attorney, Agent, or Firm* — Workman Nydegger

(57) ABSTRACT

The present invention extends to methods, systems, and computer program products for representing various programming elements with compiler-generated tasks. Embodiments of the invention enable access to the future state of a method through a handle to a single and composable task object. For example, an asynchronous method is rewritten to generate and return a handle to an instance of a builder object, which represents one or more future states of the asynchronous method. Information about operation of the asynchronous method is then passed through the handle. Accordingly, state of the asynchronous method is trackable prior to and after completing.

20 Claims, 2 Drawing Sheets

(56) References Cited

OTHER PUBLICATIONS

Toub, Implementing the Asynchronus Programing Model with Future<T>, Feb. 29, 2008, 7 pages.
MSDN, "TPL and Traditional .NET Asynchronous Programming", Based on information and belief available, at least as early as Dec. 31, 2010, 13 pages.
Henning, Michi, "A New Asynchronous Method Invocation API for ICE for Java", 2009, ZeroC, Inc., 14 pages.
Microsoft Corporation, "Axum Programmer's Guide", Based on information and belief available, at least as early as Dec. 31, 2010, 36 pages.
MSDN, Asynchronous Workflows (F#), Oct. 2010, 3 pages.

* cited by examiner

USING COMPILER-GENERATED TASKS TO REPRESENT PROGRAMMING ELEMENTS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Authoring computer applications that perform some computing tasks present unique challenges for programmers. Applications are generally broken down into one or more tasks which execute in a well-defined, sequential program control flow. A problem arises when tasks, which could otherwise be performing other functions, must wait for completion of operations having high latency. For example, an application may implement a task for that generates a user interface. At some point during execution, the user interface task may require information that is not yet available, request the information (e.g., via a method call), and then block while waiting for the information to become available. In this circumstance, the user interface would "freeze" or become unresponsive while the user interface task blocks to wait for the information to become available. For requests that return the information quickly, blocking may not present a serious problem. However, for requests with high levels of latency (e.g., requests that are computationally intensive, or requests for information from other computing systems), blocking can lead to serious performance issues. Not only can blocking make interactive applications unresponsive, blocking can hurt the scalability and performance of any application.

To address the performance penalty incurred by blocking, asynchronous programming techniques have been developed, which allow tasks to continue executing while awaiting the return of asynchronous requests. Asynchronous programming has, however, been challenging when using mainstream programming languages. To achieve asynchrony, developers are forced to code using "callbacks." That is, instead of blocking after a request for information, a task requests that a callback be sent to the task upon completion of the request for information. The task then implements callback functions that deal with callback events when they arrive and that describe what to do after each callback event. Thus, instead of a task cleanly describing a logical flow using control flow constructs of the programming language (e.g., loops, conditional statements, etc.) the task must describe "where to go upon completion" of a request via a myriad of callbacks. Using callbacks, in anything but the most simple of control flows, can become unwieldy. This is especially true when accounting for failures (e.g., exceptions). As such, implementing asynchronous solutions are typically infeasible for all but the most advanced developers.

BRIEF SUMMARY

The present invention extends to methods, systems, and computer program products for representing various programming elements with compiler-generated tasks. In some embodiments, a computer system accesses a portion of source code and recognizes an asynchronous method within the portion of source code. The computer system identifies a builder object corresponding to the asynchronous method, based on one or more of the return type of the asynchronous method and other contextual information surrounding the asynchronous method. The builder object includes instructions that expose one or more future states of the asynchronous method through a handle. The computer system also identifies a producer method that is configured to instantiate an instance of the builder object.

The computer system uses the producer method to instantiate an instance of the builder object. The computer system also rewrites the asynchronous method. When rewritten, the asynchronous method generates a handle from the builder object that represents one or more future states of the asynchronous method, returns the handle, and passes information about operation of the asynchronous method through the handle such that the state of the asynchronous method is trackable prior to and after completing.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
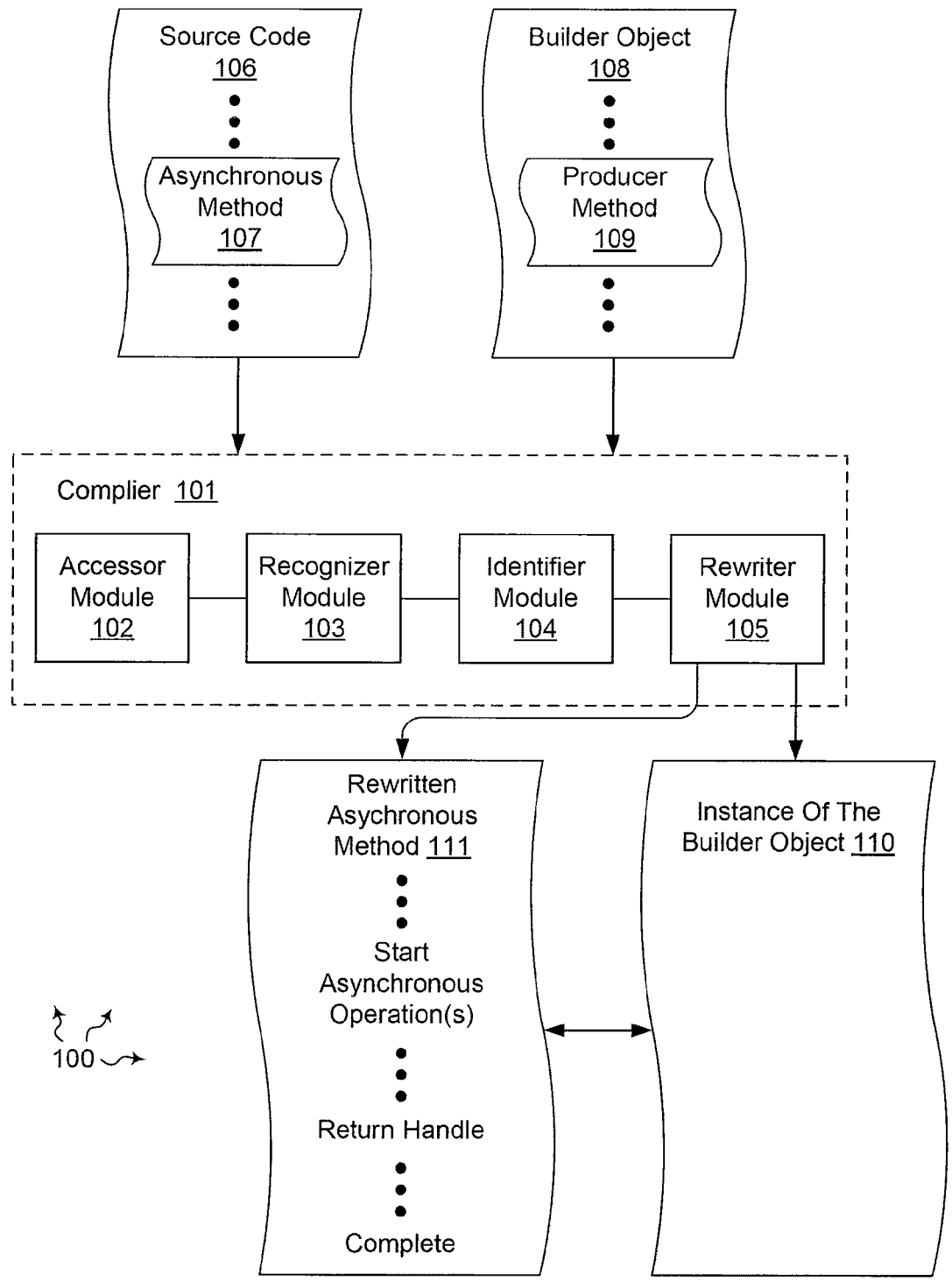
FIG. 1 illustrates an example computer architecture that facilitates representing asynchronous methods calls with compiler-generated tasks.

The present invention extends to methods, systems, and computer program products for representing various programming elements with compiler-generated tasks. In some embodiments, a computer system accesses a portion of source code and recognizes an asynchronous method within the portion of source code. The computer system identifies a builder object corresponding to the asynchronous method, based on one or more of the return type of the asynchronous method and other contextual information surrounding the asynchronous method. The builder object includes instructions that expose one or more future states of the asynchronous method through a handle. The computer system also identifies a producer method that is configured to instantiate an instance of the builder object.

The computer system uses the producer method to instantiate an instance of the builder object. The computer system also rewrites the asynchronous method. When rewritten, the asynchronous method generates a handle from the builder object that represents one or more future states of the asynchronous method, returns the handle, and passes information about operation of the asynchronous method through the handle such that the state of the asynchronous method is trackable prior to and after completing.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates representing asynchronous methods calls with compiler-generated tasks. As depicted, computer architecture 100 includes a variety of components and data including compiler 101, source code 106 and builder object 108. Each of the depicted components and data can be connected to one another over a system bus and/or over (or be part of) a network, such as, for example, a Local Area Network ("LAN"), a Wide Area Network ("WAN"), and even the Internet.

As depicted, compiler 101 is configured to process source code and builder objects to represent and support execution of various programming elements, such as asynchronous methods. Compiler 101 can be configured with one or more modules that leverage builder object 108 to rewrite asynchronous method 107, causing asynchronous method 107 to return a handle to its calling context, when executed. The handle can be a reference to a single and composable task object (e.g., a handle to an instance of builder object 108). The task object can represent the state of asynchronous method 107 as it executes asynchronous operations. As such, the task object can be usable by the calling context to obtain present status of the execution of asynchronous method 107, as well as an eventual full representation of the completion of asynchronous method 107. Completion can include, for example, successful completion (and any associated result data), exceptional completion (and any associated exception data), and completion due to cancellation (and any information about the cause of the cancellation).

Compiler 101 can include hardware and/or software components that transform a source computing language into a destination computing language. For example, compiler 101 can translate "higher-level" source code of a programming language (e.g., C#, VISUAL BASIC, JAVA, JAVASCRIPT, etc.) into "lower-level" instructions (e.g., assembly language/ machine code, intermediate language code, etc.). The instructions can then be executed by one or more physical and/or virtual computing systems, by one or more managed runtime environments, etc. The lower-level instructions can also be subject to further processing or translation. Compiler 101 can, in some embodiments, be configured to receive and transform source code for a variety of programming languages into one or more types of lower-level instructions. In other embodiments, compiler 101 can be configured to translate source code of a single programming language into a single type of lower-level instructions.

Compiler 101 can be configured with one or more modules that access and process source code and builder objects. The modules can include accessor module 102, recognizer module 103, identifier module 104, and rewriter module 105.

Accessor module 102 is configured to receive source code which, from time to time, can include one or more asynchronous methods, such as source code 106 which includes asynchronous method 107. An asynchronous method can include a portion of source code that is to be executed asynchronously with respect to the context calling the asynchronous method. That is, after a calling task and/or thread initiates/invokes the asynchronous method, the calling context can continue execution instead of blocking while awaiting completion of the asynchronous method.

Recognizer module 103 is configured to receive source code from accessor module 102 and to recognize asynchronous methods as being asynchronous through express and/or implicit indicators included in source code. For example, recognizer module 103 can be configured to identify asynchronous method 107 as being asynchronous based on one or more express keywords associated with asynchronous method 107, based on an express type of asynchronous method 107 (e.g., a particular type in a return position of a method signature), and so forth. Recognizer module 103 can also be configured to identify asynchronous method 107 as being asynchronous by implicit indicators, such as a context of asynchronous method 107 within surrounding source code. Context may include, for example, a contextual keyword (e.g., "async") having a special meaning within particular contexts, or a manner in which a calling context (e.g., a task and/or thread) treats asynchronous method 107, including whether the calling context blocks after invoking asynchronous method 107.

Recognizing asynchronous methods can also involve recognizing that a synchronous method has an asynchronous counterpart. For example, when the source code includes a call to a synchronous method, recognizer module 103 can recognize that the synchronous method has a corresponding asynchronous counterpart (e.g., in a library). In this circumstance, compiler 101 could automatically choose to use the asynchronous counterpart instead of the synchronous method. It will be appreciated that, for a single method, the compiler 101 can generate both synchronous and asynchronous versions. For example, if the source code includes a Read( . . . ) method that calls ReadByte( . . . ), the compiler 101 may recognize that ReadByte( . . . ) has a corresponding asynchronous version, ReadByteAsync( . . . ). In this circumstance, the compiler 101 can generate a Read( . . . ) method that calls ReadByte( . . . ), as well as a ReadAsync( . . . ) method that calls ReadByteAsync( . . . ).

Identifier module 104 is configured to receive the identity of the asynchronous method 107 from the recognizer module 103 and to identify a builder object and a producer method corresponding to the identified asynchronous method. Thus, once compiler 101 recognizes asynchronous method 107 in source code 106, compiler 101 can be configured to use identifier module 104 to identify builder object 108 and producer method 109 that correspond to asynchronous method 107. While producer method 109 is illustrated as being included within builder object 108, this relationship is not necessary, and producer method 109 may be separated. Builder object 108 and producer method 109 can be identified based on express and/or implicit information used to recognize asynchronous method 107 (e.g., keyword, return type, context), or any other appropriate mechanism. Compiler 101 can also be configured to employ accessor module 102 to obtain builder object 108 and producer method 109 from within source code 108, from a separate library, or from within the compiler 101 itself.

Builder object 108 includes a plurality of members, including one or more members for storing results (e.g. a "SetResult" method for storing the results of completed asynchronous operations), one or more members for storing exceptions (e.g., a "SetException" method for storing any exceptions that occur during execution of asynchronous operations), one or more members for starting asynchronous operations (e.g., a "Start" method that starts asynchronous operations in a state machine), and one or more members for returning a handle to an instance of the builder object. As mentioned previously, the handle can be used by the calling context to obtain a full representation of the completion of asynchronous method 107 (e.g., success, exception, cancellation). It will be appreciated in view of the disclosure herein that the members defined in the builder object 108 can be used to support this full representation.

Producer method 109 is configured to instantiate an instance of builder object 108. Builder object 108 and producer method 109 may be associated with asynchronous method 107 in any manner appropriate for a programming language implementing embodiment described herein. Producer method 109 can be a static method on a return type of asynchronous method 107 that instantiates builder object 108, an extension method off the return type that instantiates builder object 108, or a method for which compiler 101 has hard-coded knowledge. When using hard-coded knowledge compiler 101 would know that, for a specific return type, a particular type of builder object should be used. Other variations are also possible, such as an attribute on a method that indicates what type to use as the builder, or a configuration file that details the mapping from return type to builder. Of course, associations between asynchronous methods, producer methods, and builder objects need not be based on return type. Builder objects and producer methods can be created (e.g., as part of programming languages or libraries) for virtually any return type, and can thus enable execution of asynchronous operations from within an almost unlimited range of contexts. Additionally or alternatively, compiler 101 can have "hard-wired" knowledge of specific patterns of asynchronous method calls, as well as knowledge for how to construct a builder object for those patterns. In these circumstances, one or more of the builder object 108 or the producer method 109 may be omitted.

In general, rewriter module 105 is configured to receive the identity of the asynchronous method 107, the builder object 1018 and the producer method 109 from identifier module 104, and to rewrite asynchronous method 107 so that is generates and returns a handle to a task object that provides status of asynchronous operations. Thus, with knowledge of asynchronous method 107, builder object 108, and producer method 109, rewriter module 105 can be configured to rewrite asynchronous method 107 into a rewritten asynchronous method 111. Rewritten asynchronous method 111 can be configured to return a handle to the calling context, the handle referencing the instance of the builder object 110, and to pass information about operation of asynchronous method 107 through the handle. The instance of the builder object 110 can be instantiated internally by rewritten asynchronous method 111, or can be instantiated externally. The rewritten code can also be configured to start execution of one or more asynchronous operations using the "Start" method of the builder object 108.

As a result of the call to the "Start" method, a compiler-generated state machine can be configured to execute the requested asynchronous operations from asynchronous method 107 and to store state information in the instance of the builder object 110. For example, unhandled exceptions caught by the state machine during execution can be stored into the instance of the builder object 110 (e.g., by using the "SetException" method). Furthermore, when the state machine completes all processing and ends with a result, the result can be stored into the instance of the builder object 110 as well (e.g., by using the "SetResult" method). Of course, the compiler-generated state machine can be configured to store any other state information in the instance of the builder object 110.

Figure 2:
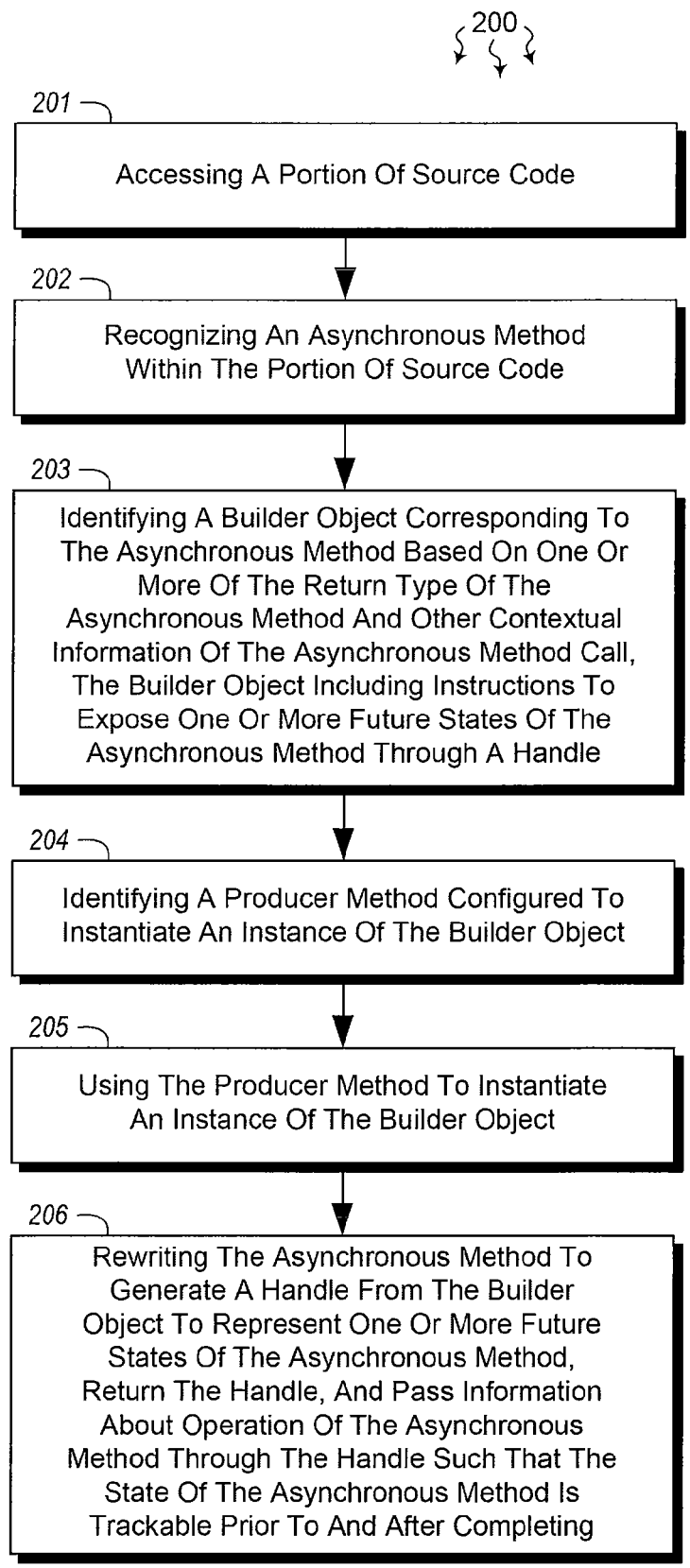
FIG. 2 illustrates a flow chart of an example method for representing an asynchronous method call.

FIG. 2 illustrates a flowchart of an example method 200 for representing an asynchronous method call. Method 200 will be described with respect to the components and data of computer architecture 100 depicted in FIG. 1.

Method 200 includes an act of accessing a portion of source code (act 201). For example accessor module 102 can access at least a portion of source code 106. Source code 106 can include asynchronous method 107, which includes one or more asynchronous operations that are to be performed while the calling context continues executing.

Subsequent to accessing source code, method 200 includes an act of recognizing an asynchronous method within the portion of source code (act 202). For example, recognizer module 103 can identify/recognize asynchronous method 107 in source code 106. Identification of asynchronous method 107 can be based on express or implicit information, such as a context of asynchronous method 107 within source code 106, an express and/or contextual keyword or identifier associated with asynchronous method 107, a pattern in a call to asynchronous method 107 (e.g., a return type), and the like.

After recognizing an asynchronous method within the source code, method 200 includes an act of identifying a builder object corresponding to the asynchronous method based on one or more of the return type of the asynchronous method and other contextual information of the asynchronous method call, the builder object including instructions to expose one or more future states of the asynchronous method through a handle (act 203). For example, identifier module 104 can identify builder object 108, which corresponds to asynchronous method 107. Identification of builder object 108 can be based on, for example, a return type of asynchronous method 107, a keyword used in connection with asynchronous method 107, use of asynchronous method 107 within other code in its calling context, or any other appropriate contextual information identifiable within a programming language of source code 106.

Builder object 108 can, once instantiated, expose current and future states of asynchronous method 107 via a handle. For instance, builder object 108 can include one or more members for storing results of asynchronous operations, one or more members for storing exceptions that occur during execution of asynchronous operations, one or more members for starting processing of asynchronous operations, and one or more members for returning the handle to the context calling asynchronous method 107.

Method 200 includes an act of identifying a producer method configured to instantiate an instance of the builder object (act 204). For example, identifier module 104 can identify producer method 109. Producer method 109 can be part of builder object 108 (as illustrated), or producer method can be separate from builder object 108. Method 200 includes an act of using the producer method to instantiate an instance of the builder object (act 205). For example, compiler 101 can generate instructions that use producer method 109 to instantiate an instance of builder object 108.

Method 200 also includes an act of rewriting the asynchronous method to generate a handle from the builder object to represent one or more future states of the asynchronous method, return the handle, and pass information about operation of the asynchronous method through the handle such that the state of the asynchronous method is trackable prior to and after completing (act 206). For example, rewriter module 105 can generate rewritten asynchronous method 111. When executed, rewritten asynchronous method 111 can generate and return a handle to the instance of the builder object 108. In some embodiments, an instance of builder object 108 is instantiated by the rewritten asynchronous method 111, while in other embodiments the instance of builder object 108 is instantiated separately.

The rewritten asynchronous method 111 starts one or more asynchronous operations (e.g., via a compiler-generated state machine), and exposes current and future state of execution of the asynchronous method via the handle. For example, the calling context can use the handle to obtain result and/or exception data for the executing asynchronous operations. Eventually, rewritten asynchronous method 111 will complete, and the handle will provide the calling context access to the eventual completion information. Completion information can include, for example, successful completion (and any associated result data), exceptional completion (and any associated exception data), and completion due to cancellation (and any information about the cause of the cancellation).

Embodiments described herein thus enable contexts (e.g., threads and/or tasks) to make calls to asynchronous methods, without blocking, by enabling the contexts to interact with a handle to a builder object. This frees calling contexts from implementing complicated callback handlers that deal with asynchronous operations as they complete. Furthermore, by extending to use of builder objects and producer methods, embodiments, enable asynchronous methods to be called from within virtually any type of context.

The embodiments will now be described in the context of exemplary computer program code. It will be appreciated that the code examples provided are for illustrative purposes only, and are in no way limiting to the applicability of the embodiments described herein. Embodiments are extendable to a variety of computer programming languages, far beyond the scope of the foregoing examples.

In some embodiments, asynchronous method 107 may take a form similar to:

```
async Task<TResult> FooAsync( )
{
    ...
    return someResultValue;
}
```

In this example, "async" is a contextual keyword which compiler 101 uses to recognize that the method "FooAsync( )" includes one or more asynchronous operations. Here, the method "FooAsync( )" returns values of type "Task<TResult>", but embodiments of the invention extend to virtually any return type. In fact, embodiments even extend to asynchronous methods that have no return value. These "fire-and-forget" methods, which may comprise a "void" return type, may not return any information directly to their invoking context, but may support the propagation of exceptions to the context that existed at the time of invocation, and may support notifying that environment of asynchronous completion through reference counting.

A builder object 108 for the "FooAsync( )" asynchronous method may take the form:

```
public class AsyncTaskMethodBuilder<TResult>
{
    public void SetResult(TResult result) {...}
    public void SetException(Exception exception) {...}
    public void Start(...) {...}
    public Task<TResult> Task {get {...}}
}
```

Here, the "AsyncTaskMethodBuilder" class includes four members: a "SetResult" method that store a result of an asynchronous operation, a "SetExceptions" method that stores any unhandled exceptions, a "Start" method that starts execution of an asynchronous task in a compiler-generated state machine, and a "get" method which returns a handle to an instance of the "AsyncTaskMethodBuilder". The builder object can be identified by the compiler 101 in response to a method call to "FooAsync( )" using express or implicit information, such as keywords or return type.

Correspondingly, a producer method 109 may take the form of a static method, such as:

```
public class Task<TResult>
{
    public static AsyncTaskMethodBuilder<TResult> CreateBuilder( )
    {
        return new AsyncTaskMethodBuilder<TResult>( );
    }
}
```

Here, the static method "AsyncTaskMethodBuilder<TResult> CreateBuilder( )" corresponds to the result type "Task<TResult>", and returns a builder using the "AsyncTaskMethodBuilder<TResult>" builder object. Thus, the compiler can use the producer method to produce an instance of the builder object. For example:

var builder=Task<TResult>.CreateBuilder( );

Alternatively, a producer method 109 may take the form of an extension method, such as:

```
public static class Extensions
{
    public static AsyncTaskMethodBuilder<TResult> CreateBuilder(this Task<TResult> prototype)
    {
        Return new AsyncTaskMethodBuilder<TResult>( );
    }
}
```

In this circumstance, instantiating the builder object 108 may take the form:

var builder=default(Task<TResult>).CreateBuilder( );

With knowledge of how to create a builder object 108 based on the return type (Task<TResult>), the compiler 101 can rewrite the FooAsync( ) method to something similar to the following:

```
Task<TResult> FooAsync( )
{
    var sm = new CompilerGeneratedStateMachine( );
    sm.builder = Task<TResult>.CreateBuilder( );
    sm.Start(...);
    return sm.Task;
}
```

Here, the rewritten FooAsync( ) method instantiates a compiler generated state machine (sm), instantiates an instance of the builder object 110 (using the static producer method, in this case), starts execution of an asynchronous operation on the state machine, and returns a handle to the instantiated builder object 110. Thus, the context calling "async Task<TResult> FooAsync( )" receives a handle to an object of type "AsyncTaskMethodBuilder", and can continue execution of other tasks while any asynchronous operations complete on the state machine. When completed, whether the calling context can use the handle to obtain full completion information for the "FooAsync( )" method from the "AsyncTaskMethodBuilder" object. The completion information becomes available at the handle as the compiler generated state machine uses the SetResult( ) and SetException( )methods of the builder object to provide result and exception information.

Accordingly, embodiments of the invention enable access to the future state of a method through a handle to a single and composable task object. For example, an asynchronous method is rewritten to generate and return a handle to an instance of a builder object, which represents one or more future states of the asynchronous method. Information about operation of the asynchronous method is then passed through the handle. Accordingly, state of the asynchronous method is trackable prior to and after completing.

It will be appreciated, however, the embodiments described herein are applicable to a host of programming constructs. In one embodiment, for example, a builder object can represent an asynchronous iterator by being extended to support the passing of information in both directions between the holder of the handle and the builder object. For instance, an iterator version of a builder object may include the ability to pass back partial/intermediate values to the holder, instead of or in addition to a final result, and may also allow the holder to control of the forward progress of the asynchronous operations.

Thus, when the asynchronous method passes information out of the builder object through the handle, the asynchronous operation may also be paused. The asynchronous operation could then be resumed when information is passed back through the handle, which informs the asynchronous operation to resume. This enables the holder of the handle to control the asynchronous method as if it were an iterator that may be driven on demand by the holder. Furthermore, by supporting the passing of both state and data through the handle, the asynchronous iterator can yield multiple values that can be influenced on demand by the holder.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including an accessor module, a recognizer module, an identifier module, and a rewriter module for converting source code into executable code, a method for representing an asynchronous method call, the method comprising:
   an act of accessing a portion of source code;
   an act of recognizing an asynchronous method within the portion of source code;
   an act of identifying a builder object corresponding to the asynchronous method based on one or more of the return type of the asynchronous method and other contextual information of the asynchronous method call, the builder object including instructions to expose one or more future states of the asynchronous method through a handle;
   an act of identifying a producer method configured to instantiate an instance of the builder object; and
   an act of receiving the identity of the asynchronous method, the builder object, and the producer method from the identifier module and rewriting the asynchronous method to:
      use the producer method to instantiate an instance of the builder object,
      generate a handle from the builder object to represent one or more future states of the asynchronous method,
      return the handle, and
      pass information about operation of the asynchronous method through the handle such that the state of the asynchronous method is trackable prior to and after completing.

2. The method as recited in claim 1, wherein the act of identifying a builder object corresponding to the asynchronous method comprises an act of identifying other contextual information including a contextual keyword having special meaning within a particular context.

3. The method as recited in claim 1, wherein the act of identifying a builder object comprises an act of identifying a builder object that includes one or more members for storing results of one or more asynchronous operations, and one or more members for storing exceptions that occur during execution of one or more asynchronous operations.

4. The method as recited in claim 1, wherein the act of identifying a builder object comprises an act of identifying a builder object that includes one or more members for starting execution of one or more asynchronous operations in a state machine.

5. The method as recited in claim 1, wherein the one or more future states of the asynchronous method comprise one or more of: successful completion, exceptional completion, or completion due to cancellation.

6. The method as recited in claim 1, further comprising:
   an act of using a compiler-generated state machine to execute one or more asynchronous operations of the asynchronous method, the compiler-generated state machine storing state information in the instance of the builder object.

7. The method as recited in claim 6, wherein the act of using a compiler-generated state machine to execute one or more asynchronous operations of the asynchronous method comprises an act of using a compiler-generated state machine that stores unhandled exception state information in the instance of the builder object.

8. The method as recited in claim 6, wherein the act of using a compiler-generated state machine to execute one or more asynchronous operations of the asynchronous method comprises an act of using a compiler-generated state machine that stores result state information in the instance of the builder object.

9. A computer program product for use at a computer system, the computer program product for implementing a method for representing an asynchronous method call, the computer program product comprising one or more computer storage media having stored thereon computer-executable instructions that, when executed at a processor, cause the computer system including an accessor module, a recognizer module, an identifier module, and a rewriter module to perform the method, comprising the following:
   access a portion of source code;
   recognize an asynchronous method within the portion of source code;
   identify a builder object corresponding to the asynchronous method based on one or more of the return type of the asynchronous method and other contextual information of the asynchronous method call, the builder object including instructions to expose one or more future states of the asynchronous method through a handle;
   identify a producer method configured to instantiate an instance of the builder object; and
   receive the identity of the asynchronous method, the builder object, and the producer method from the identifier module and rewrite the asynchronous method to:
      use the producer method to instantiate an instance of the builder object,
      generate a handle from the builder object to represent one or more future states of the asynchronous method,
      return the handle, and
      pass information about operation of the asynchronous method through the handle such that the state of the asynchronous method is trackable prior to and after completing.

10. The computer program product as recited in claim 9, wherein the other contextual information comprises a contextual keyword having special meaning within particular contexts.

11. The computer program product as recited in claim 9, wherein the builder object comprises:
   a member for storing results of one or more asynchronous operations; and
   a member for storing exceptions that occur during execution of one or more asynchronous operations.

12. The computer program product as recited in claim 9, wherein the builder object comprises:
   a member for starting execution of one or more asynchronous operations in a state machine.

13. The computer program product as recited in claim 9, wherein the one or more future states of the asynchronous method comprise one or more of: successful completion, exceptional completion, or completion due to cancellation.

14. The computer program product as recited in claim 9, further comprising computer-executable instructions that, when executed at the processor, cause the computer system to:
   use a compiler-generated state machine to execute one or more asynchronous operations of the asynchronous method, the compiler-generated state machine storing state information in the instance of the builder object.

15. The computer program product as recited in claim 14, wherein using a compiler-generated state machine to execute one or more asynchronous operations of the asynchronous method comprises using a compiler-generated state machine that stores unhandled exception state information in the instance of the builder object.

16. The computer program product as recited in claim 14, wherein using a compiler-generated state machine to execute one or more asynchronous operations of the asynchronous method comprises using a compiler-generated state machine that stores result state information in the instance of the builder object.

17. A computer system, the computer system comprising:
one or more processors;
system memory; and
one or more computer storage devices having stored thereon computer executable instructions representing a compiler, the compiler including an accessor module, a recognizer module, an identifier module, and a rewriter module,
wherein the accessor module is configured to access a portion of source code;
wherein the recognizer module is configured to receive a portion of source code from the accessor module and to recognize an asynchronous method within the portion of source code;
wherein the identifier module is configured to receive the identity of the asynchronous method from the recognizer module and to:
identify a builder object corresponding to the asynchronous method based on one or more of the return type of the asynchronous method and other contextual information of the asynchronous method call, the builder object including instructions to expose one or more future states of the asynchronous method through a handle; and
identify a producer method configured to instantiate an instance of the builder object; and
wherein the rewriter module is configured to receive the identity of the asynchronous method, the builder object, and the producer method from the identifier module and to rewrite the asynchronous method to:
use the producer method to instantiate an instance of the builder object,
generate a handle from the builder object to represent one or more future states of the asynchronous method through the instance of the builder object,
return the handle, and
pass information about operation of the asynchronous method through the handle such that the state of the asynchronous method is trackable prior to and after completing.

18. The computer system as recited in claim 17, wherein the rewriter module is also configured to rewrite the asynchronous method to use a compiler-generated state machine to execute one or more asynchronous operations of the asynchronous method, the compiler-generated state machine storing state information in the instance of the builder object.

19. The computer system as recited in claim 18, wherein the compiler-generated state machine stores one or more unhandled exception state information or result state information in the instance of the builder object.

20. The computer system as recited in claim 17, wherein the builder object comprises:
a member for storing results of one or more asynchronous operations;
a member for storing exceptions that occur during execution of one or more asynchronous operations; and
a member for starting execution of one or more asynchronous operations of the asynchronous method in a compiler-generated state machine.

* * * * *